United States Patent
Katayama (10) Patent No.: US 11,640,278 B2
(45) Date of Patent: May 2, 2023

(54) RANDOM NUMBER GENERATION DEVICE AND METHOD OF GENERATING RANDOM NUMBERS

(71) Applicant: FUJITSU LIMITED, Kawasaki (JP)

(72) Inventor: Kentaro Katayama, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 364 days.

(21) Appl. No.: 17/004,055

(22) Filed: Aug. 27, 2020

(65) Prior Publication Data

US 2021/0096820 A1  Apr. 1, 2021

(30) Foreign Application Priority Data

Sep. 26, 2019  (JP) .............................. JP2019-175609

(51) Int. Cl.
*G06F 7/58* (2006.01)
(52) U.S. Cl.
CPC .................................... *G06F 7/582* (2013.01)
(58) Field of Classification Search
CPC .................................................. G06F 7/58–588
See application file for complete search history.

(56) References Cited

U.S. PATENT DOCUMENTS

2020/0026499 A1 *  1/2020  Guo ........................ G06N 3/084
2020/0201604 A1 *  6/2020  Felix ........................ G06N 3/08

FOREIGN PATENT DOCUMENTS

JP   2005-038229 A   2/2005
JP   2007-087064 A   4/2007

OTHER PUBLICATIONS

J. S. Malik, A. Hemani, J. N. Malik, B. Silmane and N. D. Gohar, "Revisiting Central Limit Theorem: Accurate Gaussian Random Number Generation in VLSI," in IEEE Transactions on Very Large Scale Integration (VLSI) Systems, vol. 23, No. 5, pp. 842-855, May 2015, doi: 10.1109/TVLSI.2014.2322573. (Year: 2015).*
J. S. Malik and A. Hemani. 2016. Gaussian random number generation: A survey on hardware architectures. ACM Comput. Surv. 49, 3, Article 53 (Oct. 2016), 37 pages. DOI: http://dx.doi.org/10.1145/2980052 (Year: 2016).*
D. B. Davis "Parallel generation of Gaussian random numbers using the Table-Hadamard transform" in 2013 21st Annual International IEEE Symposium on Field-Programmable Custom Computing Machines, https://ieeexplore.ieee.org/stamp/stamp.jsp?arnumber=6546012 (Year: 2013).*

* cited by examiner

*Primary Examiner* — Jyoti Mehta
*Assistant Examiner* — Carlo Waje
(74) *Attorney, Agent, or Firm* — Fujitsu Patent Center (57) ABSTRACT

A random number generation device includes: a plurality of first uniform random number generators configured to respectively generate a plurality of first uniform random numbers; a plurality of first normal random number generators configured to respectively generate a plurality of first normal random numbers based on the plurality of first uniform random numbers; a plurality of second uniform random number generators configured to perform a logical operation on bit values of two or more of the first uniform random numbers to respectively generate a plurality of second uniform random numbers; and at least one second normal random number generator configured to generate at least one second normal random number based on the plurality of second uniform random numbers.

8 Claims, 9 Drawing Sheets

RANDOM NUMBER GENERATION DEVICE AND METHOD OF GENERATING RANDOM NUMBERS

CROSS-REFERENCE TO RELATED APPLICATION

This application is based upon and claims the benefit of priority of the prior Japanese Patent Application No. 2019475609, filed on Sep. 26, 2019, the entire contents of which are incorporated herein by reference.

FIELD

The embodiments discussed herein are related to a random number generation device and a method of generating random numbers,

BACKGROUND

A method is known in which, in a random number generation device that generates random numbers, an M-sequence cyclic code generator generates a seed value and sequentially supplies the seed value to a plurality of M-sequence cyclic code generators, thereby reducing the number of seed registers and suppressing an increase in the scale of hardware. In addition, a method is known in which bits of uniform random numbers generated by a plurality of uniform random number generators are rearranged to generate a plurality of uniform random numbers, and then the same terms of the uniform random numbers are summed to generate a normally distributed random numbers while avoiding correlation between sequences.

Related art is disclosed in Japanese Laid-open Patent Publication No. 2007-87064 and Japanese Laid-open Patent Publication No. 2005-38229.

SUMMARY

According to an aspect of the embodiments, a random number generation device includes: a plurality of first uniform random number generators configured to respectively generate a plurality of first uniform random numbers; a plurality of first normal random number generators configured to respectively generate a plurality of first normal random numbers based on the plurality of first uniform random numbers; a plurality of second uniform random number generators configured to perform a logical operation on bit values of two or more of the first uniform random numbers to respectively generate a plurality of second uniform random numbers; and at least one second normal random number generator configured to generate at least one second normal random number based on the plurality of second uniform random numbers.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2 is a block diagram illustrating an example of a system in which the random number generation device illustrated in. FIG. 1 is installed;

DESCRIPTION OF EMBODIMENTS

Nowadays, in order to improve accuracy of calculation of various simulations and numerical analyses by the Monte Carlo method or the like, the number of normal random numbers used for calculation tends to increase, and the number of random number generation devices used for calculation tends to increase. As a result, the scale of the hardware of the random number generation devices mounted in the information processing apparatus that executes calculation such as simulation increases, and the cost for generating random numbers increases.

In one aspect, the present embodiment generates a larger number of normal random numbers while suppressing an increase in circuit scale.

Hereinafter, embodiments will be described with reference to the drawings.

Figure 1:
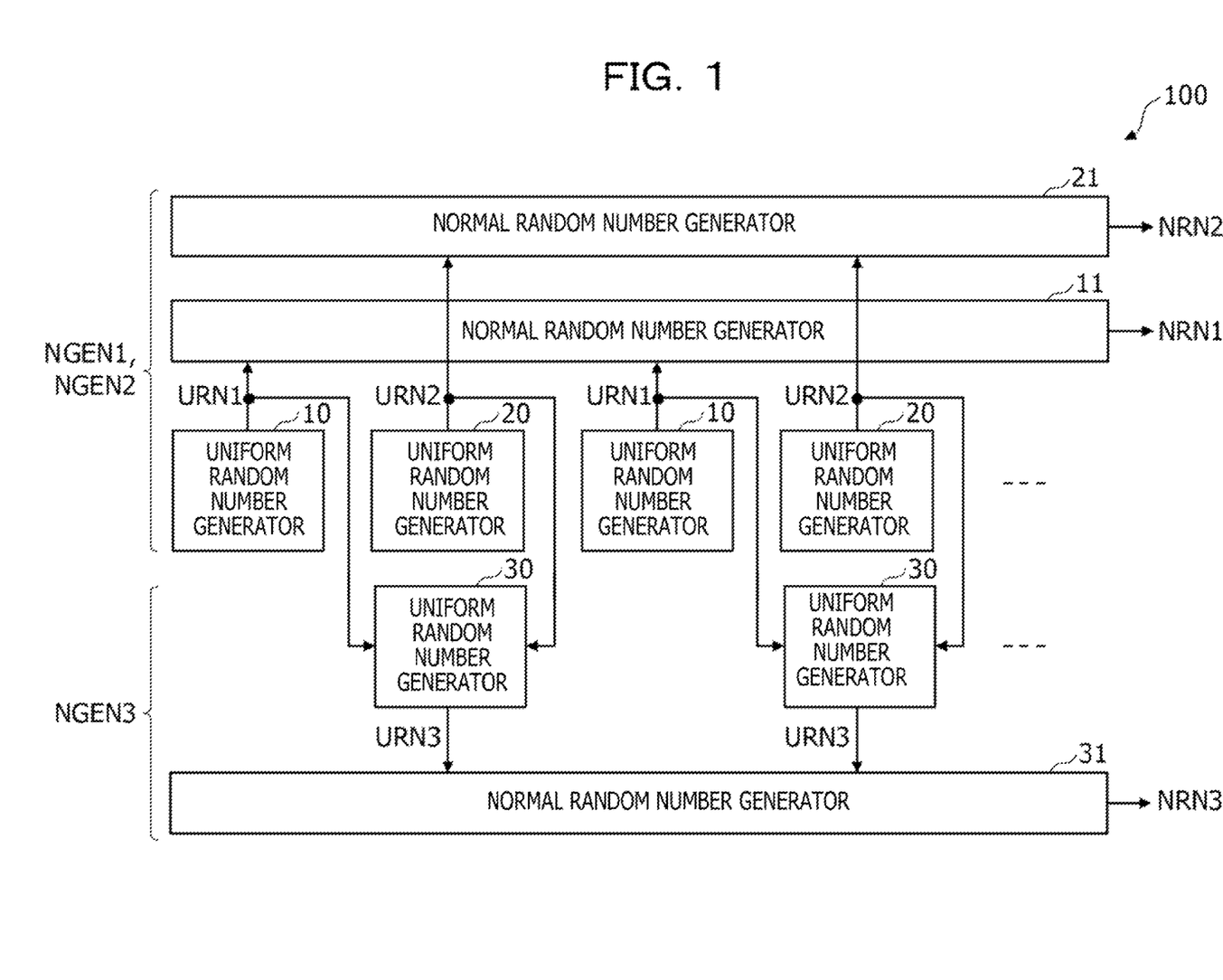
FIG. 1 is a block diagram illustrating an example of a random number generation device according to an embodiment.

FIG. 1 illustrates an example of a random number generation device according to an embodiment. The random number generation device 100 illustrated in FIG. 1 includes a normal random number generation units NGEN (NGEN1, NGEN2, NGEN3). The normal random number generation unit NGEN1 includes a plurality of uniform random number generators 10 and a normal random number generator 11. The normal random number generation unit NGEN2 includes a plurality of uniform random number generators 20 and a normal random number generator 21. The normal random number generation unit NGEN3 includes a plurality of uniform random number generators 30 and a normal random number generator 31.

The uniform random number generators 10 generate respective uniform random numbers URN1, and the normal random number generator 11 generates normal random numbers NRN1 based on the uniform random numbers URN1 generated by the respective uniform random number generators 10. The uniform random number generators 20 generate respective uniform random numbers URN2, and the normal random number generator 21 generates normal random numbers NRN2 based on the uniform random numbers URN2 generated by the respective uniform random number generators 20.

Each of the uniform random numbers URN1, URN2 is an example of a first uniform random number, and each of the normal random numbers NRN1, NRN2 is an example of a first normal random number. Uniform random numbers URN3 are examples of a second uniform random number, and a normal random number NRN3 is an example of a second normal random number. Each of the uniform random number generators 10, 20 is an example of a first uniform random number generator, and each of the normal random number generators 11, 21 is an example of a first normal random number generator. Each of the uniform random number generators 30 is an example of a second uniform random number generator, and the normal random number generator 31 is an example of a second normal random number generator.

The uniform random number generators 30 generate the respective uniform random numbers URN3 based on two uniform random numbers URN1, URN2 out of a plurality of uniform random numbers URN1 and a plurality of uniform random numbers URN2 generated by the uniform random number generators 10, 20. Although the uniform random number generators 30 each receive a single uniform random number URN1 and a single uniform random number URN2 in FIG. 1, the uniform random number generator 30 may receive two uniform random numbers URN1 or two uniform random numbers URN2.

For example, the uniform random number generators 30 each include a logical operation circuit (logical operation unit) that performs a bitwise bit operation on a plurality of bits of the uniform random numbers URN1, URN2. The normal random number generator 31 generates normal random numbers NRN3 based on the uniform random numbers URN3 generated by the respective uniform random number generators 30.

For example, the random number generation device 100 includes twelve uniform random number generators 10, twelve uniform random number generators 20, and twelve uniform random number generators 30. Thus, each of the normal random number generation units NGEN1, NGEN2, NGEN3 are able to generate the normal random numbers NRN (NRN1, NRN2, NRN3) from the plurality of uniform random numbers URN1, URN2, URN3 in accordance with the central limit theorem.

In the random number generation device 100 illustrated in FIG. 1, the uniform random number generators 30 each generate the uniform random number URN3 based on two uniform random numbers out of the uniform random numbers URN1, URN2 generated by the uniform random number generators 10, 20. However, the uniform random number generator 30 may generate the uniform random number URN3 based on three or more uniform random numbers URN (URN1, URN2, or URN1 and URN2).

According to the present embodiment, the uniform random numbers URN3 used to generate the normal random numbers NRN3 are generated by using the uniform random numbers URN1, URN2 generated by the uniform random number generators 10, 20. Thus, the uniform random number generators 30 may be configured as a simple circuit compared to that of the uniform random number generators 10, 20. This may allow downscaling of the circuit of the random number generation device 100 compared to that of other normal random number generation devices that generate the same number of normal random numbers NRN. For example, a larger number of normal random numbers NRN may be generated while suppressing the circuit scale of the random number generation device 100. For example, when a circuit size (the number of logic gates or the like) usable for the random number generation device 100 is fixed, a large number of the normal random numbers NRN may be generated compared to other normal random number generation devices.

Figure 2:
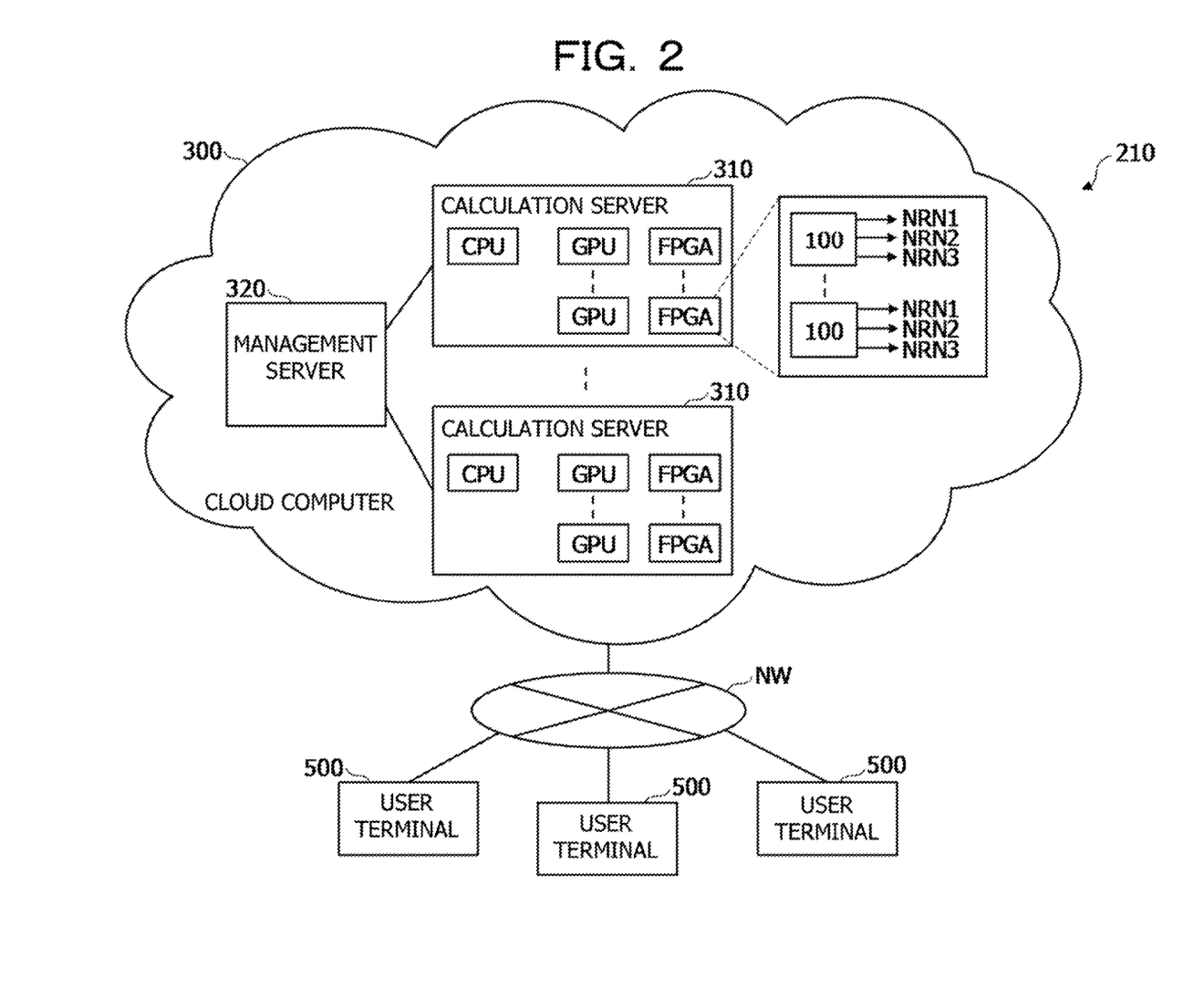

FIG. 2 illustrates an example of a system in which the random number generation device 100 illustrated in FIG. 1 is installed. A system 210 illustrated in FIG. 2 includes, for example, a server system 300 that functions as a cloud computer. The server system 300 includes a plurality of calculation servers 310 and a management server 320 that manages operations of the calculation servers 310. The server system 300 is accessible from a plurality of user terminals 500 via a network NW such as the Internet.

Accordingly, for example, the user is able to cause the server system 300 to execute various types of information processing via the user terminal 500. Examples of information processing executable by the server system 300 include, for example, numerical analyses, image processing, financial simulations, various simulations in the design of large-scale integration (LSI), and machine learning such as deep learning. The server system 300 may be used for Web search systems or cloud services.

For example, each of the calculation servers 310 includes a central processing unit (CPU), a plurality of graphics processing units (GPUs), and a plurality of field-programmable gate arrays (FPGAs). The calculation server 310 may include two or more CPUs mounted therein. For example, the GPUs and the FPGAs operate as accelerators based on instructions from the CPU. The calculation server 310 may include only FPGAs or may include FPGAs and a digital signal processor (DSP).

A plurality of random number generation devices 100 illustrated in FIG. 1 are provided in the FPGA by transferring circuit information of the random number generation device 100 to one or more FPGAs. The normal random numbers NRN1, NRN2, NRN3 generated by the random number generation device 100 are used for, for example, numerical analyses, image processing, or various simulations.

According to the present embodiment, the circuit scale of the random number generation device 100 that generates normal random numbers may be reduced compared to the circuit scale of other random number generation devices. Thus, for example, a larger number of the random number generation devices 100 may be installed in an area for the random number generation device 100 allocated in the FPGA. Accordingly, even when the number of normal random numbers used for calculation is increased for improvement of accuracy of numerical calculation or the like, a problem in that the number of normal random numbers to be generated is insufficient may be suppressed. The random number generation device 100 may be installed in application-specific integrated circuits (ASICs) or the like mounted on the calculation server 310.

For example, in a financial simulation, the number of normal random numbers to be used exponentially increases by increasing the number of stock brands. In an LSI design simulation, the number of normal random numbers to be used exponentially increases by increasing the number of parameters. In a cloud service in which an FPGA is mounted, for example, when a Monte Carlo simulation is executed in parallel by a large number of users (user terminals 500), a large number of normal random numbers are used.

Figure 3:
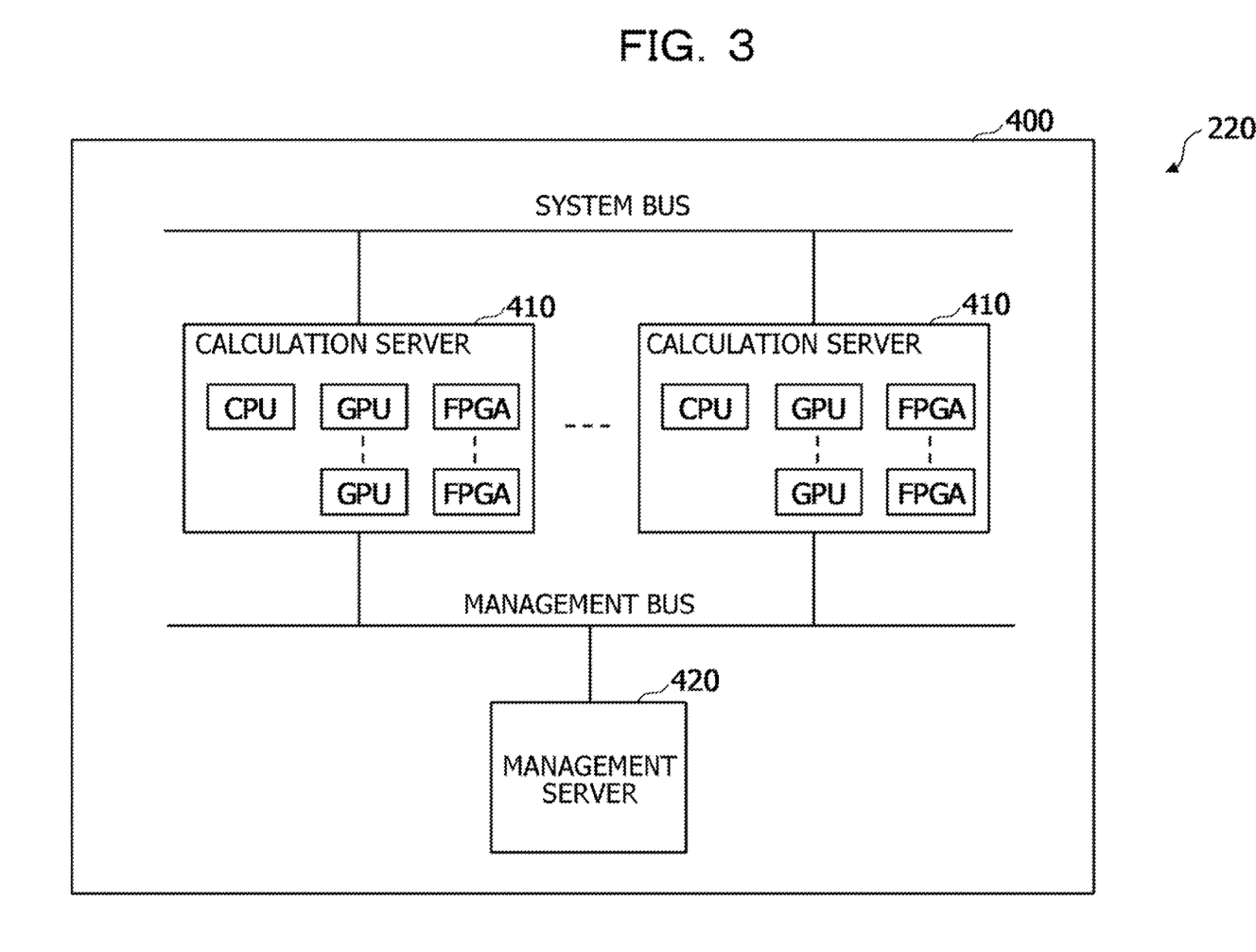
FIG. 3 is a block diagram illustrating another example of the system in which the random number generation device illustrated in FIG. 1 is installed.

FIG. 3 illustrates another example of the system in which the random number generation device 100 illustrated in FIG. 1 is installed. A system 220 illustrated in FIG. 3 is a server system 400 that includes, for example, a plurality of calculation servers 410 and a management server 420. The calculation servers 410 are coupled to each other via a system bus and coupled to the management server 420 via a management bus.

As is the case with the calculation servers 310 illustrated in FIG. 2, the calculation servers 410 each include a CPU, a plurality of FPGAs, and a plurality of GPUs that function as accelerators. The calculation server 410 may include a DSP. A plurality of random number generation devices 100 illustrated in FIG. 1 are provided in the FPGA by transferring the circuit information of the random number generation device 100 to at least one FPGA, As is the case with the server system 300 illustrated in FIG. 2, the normal random numbers NRN generated by the random number generation device 100 are used for numerical analyses, image processing, financial simulations, various simulations in LSI design, and machine learning such as deep learning.

As described above, according to the embodiment illustrated in FIGS. 1 to 3, the uniform random number generator 30 may be configured as a simple circuit compared to the uniform random number generators 10, 20. This may reduce the circuit scale of the random number generation device 100 compared to the circuit scale of other normal random number generation devices. For example, a larger number of normal random numbers NRN may be generated while suppressing the circuit scale of the random number generation device 100. Since the normal random number generation unit NGEN3 includes twelve uniform random number generators 30, the normal random number generation unit NGEN3 is able to generate the normal random number NRN3 from the plurality of uniform random numbers URN1, URN2 in accordance with the central limit theorem.

Figure 4:
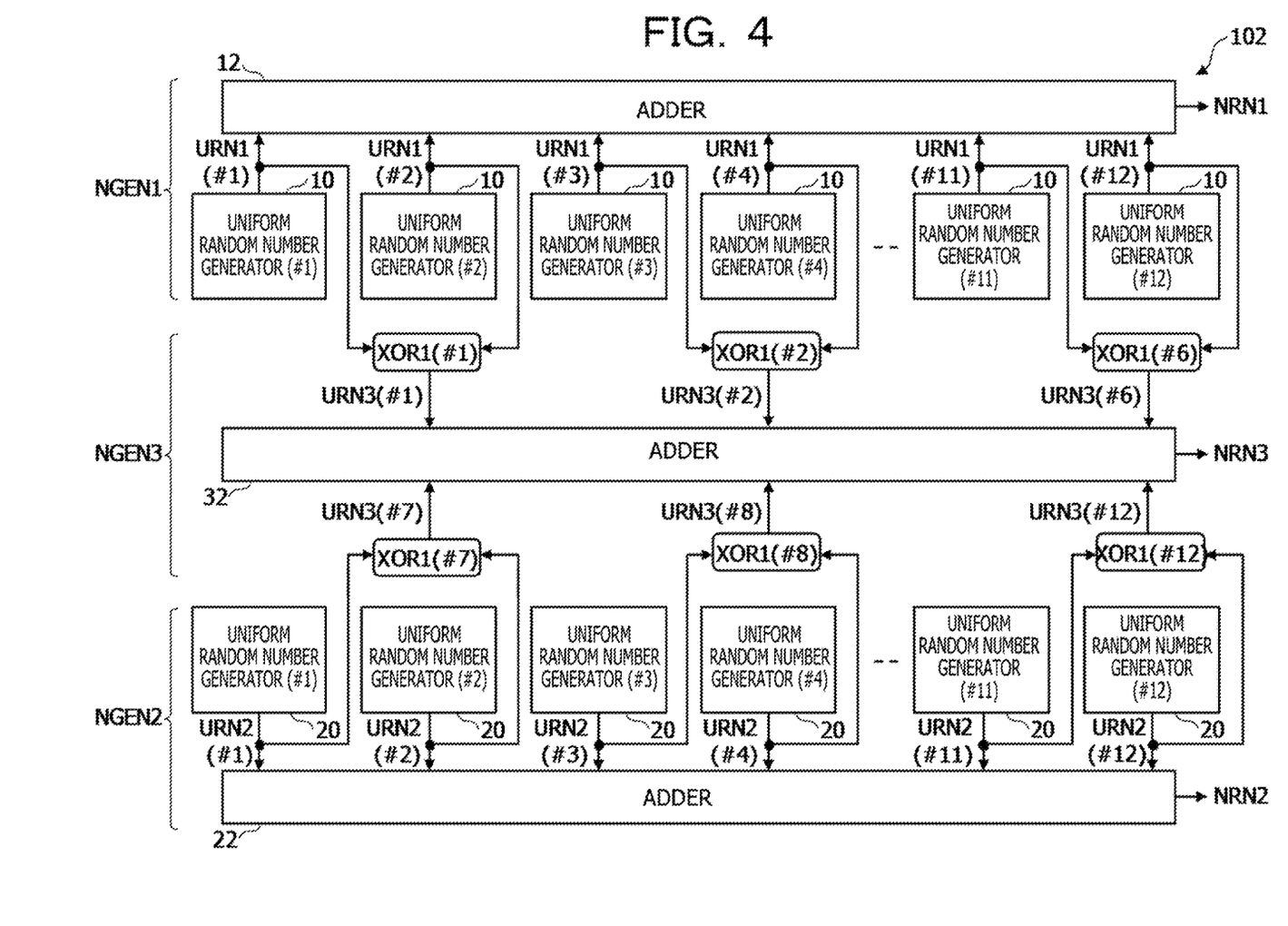
FIG. 4 is a block diagram illustrating an example of a random number generation device according to another embodiment.

FIG. 4 illustrates an example of a random number generation device according to another embodiment. Detailed description of the same elements as those illustrated in FIG. 1 is omitted. For example, a random number generation device 102 illustrated in FIG. 4 is provided in the FPGA or an ASIC (not illustrated) of the calculation server 310 illustrated in FIG. 2 or in the FPGA or an ASIC (not illustrated) of the calculation server 410 illustrated in FIG. 3.

The random number generation device 102 includes three normal random number generation units NGEN (NGEN1, NGEN2, NGEN3). For example, the normal random number generation unit NGEN1 includes twelve uniform random number generators 10 (#1 to 12) and an adder 12. For example, the normal random number generation unit NGEN2 includes 12 uniform random number generators 20 (#1 to 12) and an adder 22. The adders 12, 22 are examples of the first normal random number generator.

For clear understanding of description, FIG. 4 illustrates an example which the random number generation device 102 includes three normal random number generation units NGEN1 to NGEN3. Actually, the random number generation device 102 includes a plurality of sets of three normal random number generation units NGEN1 to NGEN3 in accordance with a circuit area allocated in the FPGA. This allows the random number generation device 102 to generate a large number of normal random numbers NRN (NRN1, NRN2, NRN3).

In the normal random number generation unit NGEN1, the uniform random number generators 10 (#1 to 12) generate, based on seed values (not illustrated), twelve uniform random numbers URN1 (#1 to 12) that are different from each other. Since there are different seed values for the different uniform random number generators 10 (#1 to 12), the twelve uniform random numbers URN1 (#1 to 12) are not correlated to each other.

The adder 12 adds up a plurality of uniform random numbers URN1 to generate a normal random number NRN1. For example, the adder 12 adds up twelve uniform random numbers URN1 (#1 to 12) not correlated to each other. This allows generation of the normal random number NRN1 by the central limit theorem.

In the normal random number generation unit NGEN2, the uniform random number generators 20 (#1 to 12) generate, based on seed values (not illustrated), twelve uniform random numbers URN2 (#1 to 12) that are different from each other. Since there are different seed values for the different uniform random number generators 20 (#1 to 12), the twelve uniform random numbers URN2 (#1 to 12) are not correlated to each other.

The adder 22 adds up a plurality of uniform random numbers URN2 to generate a normal random number NRN2. For example, the adder 22 adds up twelve uniform random numbers URN2 (#1 to 12) not correlated to each other. This allows generation of the normal random number NRN2 in accordance with the central limit theorem.

For example, the normal random number generation unit NGEN3 includes twelve exclusive OR circuits XOR1 (#1 to 12) and an adder 32. Each of the exclusive OR circuits XOR1 is an example of the logical operation unit and an example of a first exclusive OR circuit. The adder 32 is an example of the second normal random number generator. Hereinafter, the exclusive OR circuit XOR1 is also simply referred to as an XOR1.

Each of the XOR1s (#1 to 12) performs a logical operation on two uniform random numbers URN1 generated by two uniform random number generators 10 or two uniform random numbers URN2 generated by two uniform random number generators 20, thereby generating a uniform random number URN3. For example, each of the XOR1s performs a bit operation of an exclusive OR on a plurality of bits of two uniform random numbers URN1 (or URN2) bitwise, thereby generating the uniform random number URN3. For example, each of the XOR1s takes an exclusive OR of the bit values of the same bit numbers in two uniform random numbers URN1 (or URN2), thereby generating bit values of the uniform random number URN3.

For example, in FIG. 4, the XOR1 (#1) generates the uniform random number URN3 (#1) based on the uniform random numbers URN1 (#1, #2), and the XOR1 (#2) generates the uniform random number URN3 (#2) based on the uniform random numbers URN1 (#3, #4). The XOR1 (#6) generates the uniform random number URN3 (#6) based on the uniform random numbers URN1 (#11/#12). When the variable n is any of 1 to 6, the XOR1 (#n) generates the uniform random number URN3 (#n) based on the uniform random numbers URN1 (#2n-1) and URN1 (#2n).

The XOR1 (#7) generates the uniform random number URN3 (#7) based on the uniform random numbers URN2 (#1, #2), and the XOR1 (#8) generates the uniform random number URN3 (#8) based on the uniform random numbers URN2 (#3, #4). The XOR1 (#12) generates the uniform random number URN3 (#12) based on the uniform random numbers URN2 (#11, #12). When the variable n is any of 7 to 12, the XOR1 (#n) generates the uniform random number URN3 (#n) based on the uniform random numbers URN2 (#2(n-6)-1) and URN2 (#2(n-6)).

The two uniform random numbers (URN1 or URN2) supplied to any one of the XOR1s (#1 to 12) are generated based on different seed values, and accordingly, not correlated to each other. it has been confirmed that the XOR1 (any one of #1 to 12) generates the uniform random number URN3 correlated to neither of two uniform random numbers when the two uniform random numbers having been input are not correlated to each other.

The adder 32 adds up a plurality of uniform random numbers URN3 to generate a normal random number NRN3. For example, the adder 32 adds up twelve uniform random numbers URN3 (#1 to 12) not correlated to each other. This allows generation of the normal random number NRN3 in accordance with the central limit theorem.

For example, the uniform random number generators 10, 20 are provided by utilizing Xorshift 128, which is one of pseudorandom number generators. The uniform random number generators 10, 20 by the Xorshift 128 include, for example, four exclusive OR circuits (XORs) coupled in series. When the XOR includes four NAND gates, each of the uniform random number generators 10, 20 with Xorshift 128 includes 16 NAND gates. Accordingly, a logic scale of the normal random number generation unit NGEN1 except for the logic of the adder 12 corresponds to a logic scale of 192 NAND gates. Likewise, a logic scale of the normal random number generation unit NGEN2 except for the logic of the adder 22 corresponds to a logic scale of 192 NAND gates.

The normal random number generation unit NGEN3 except for the logic of the adder 32 includes twelve XOR1s, corresponding to a logic scale of 48 NAND gates. Therefore, the logic scale of the uniform random number generator 10, 20 and the XOR1s of the random number generation device 102 is 432 (192+192+48) in terms of NAND gates.

When the normal random number generation unit NGEN3 is configured with twelve uniform random number generators 10 as is the case with the normal random number generation unit NGEN1, the logic scale of the normal random number generation unit NGEN3 except for the logic scale of the adder 32 corresponds to the logic scale of 192 NAND gates. In this case, the logic scale of the normal random number generation device including three normal random number generation units NGEN1, NGEN2, NGEN3 of the same logic configurations is 576 (192+192+192) in terms of NAND gates. Accordingly, the logic scale of the random number generation device 102 except for the adders 12, 22, 32 is able to be reduced by 25% ((576-432)/576) compared to the logic scale of a normal random number generation device including three normal random number generation units that are identical to each other.

As has been described, according to the embodiment illustrated in FIG. 4, as is the case with the embodiment illustrated in FIG. 1, the uniform random numbers URN1, URN2 generated by the uniform random number generators 10, 20 are used to generate the uniform random number URN3 by using the XOR1s which are a type of the logical operation unit. Accordingly, the circuit scale of the uniform random number generators (XOR1s) that generate twelve uniform random numbers URN3 to be supplied to the adder 32 is able to be reduced compared to the circuit scale of the twelve uniform random number generators 10 (or 20). As a result, a larger number of normal random numbers NRN1, NRN2, NRN3 may be generated while suppressing the circuit scale of the random number generation device 102.

According to the present embodiment, the uniform random numbers URN1, URN2 generated by the uniform random number generators 10, 20 are used to generate the uniform random number URN3 by using the XOR1s, and the normal random number NRN3 is generated by adding up the uniform random numbers URN1, URN2, URN3. Thus, the normal random numbers NRN3 conforming to a high-quality normal distribution may be generated in accordance with the central limit theorem.

Figure 5:
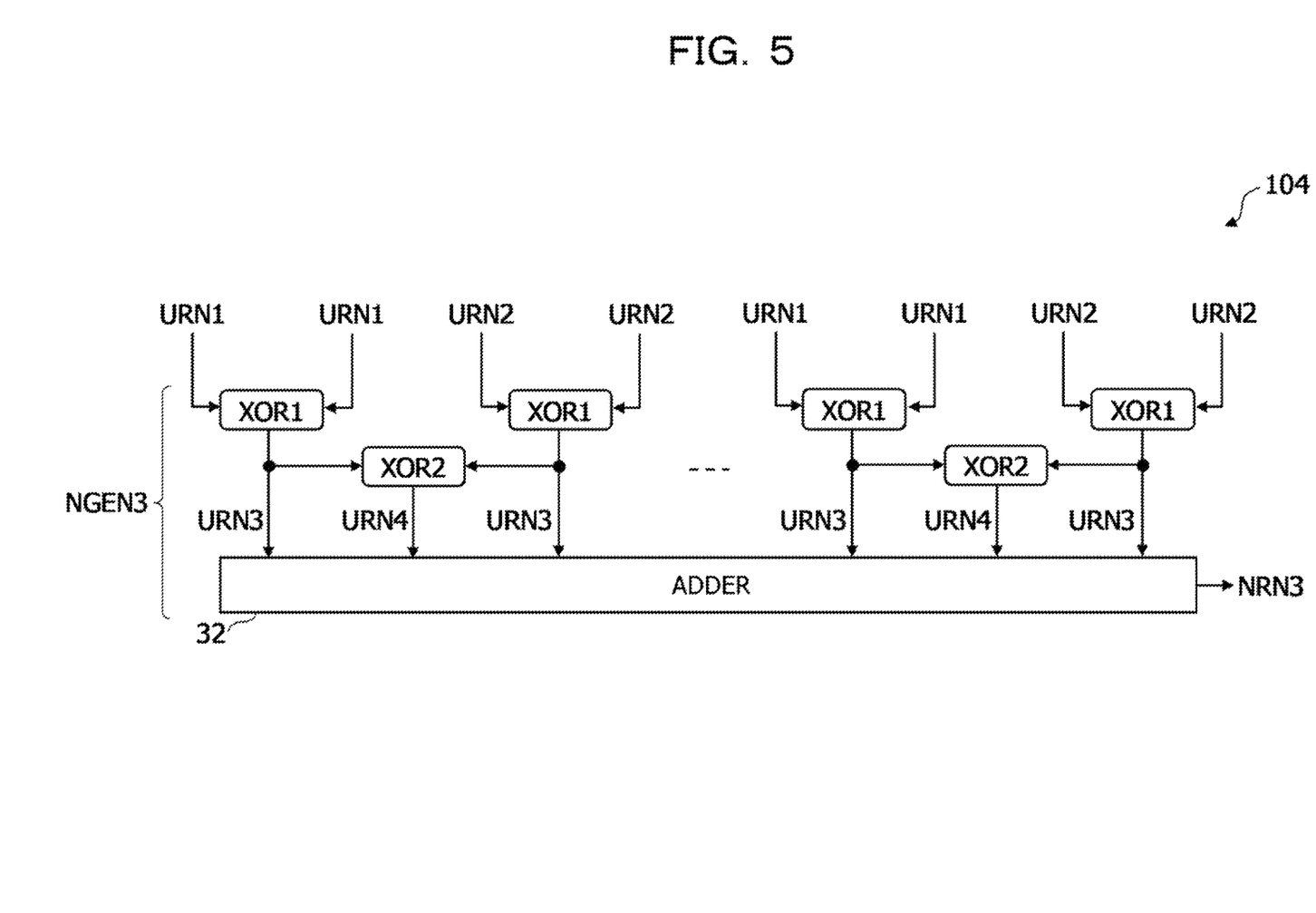
FIG. 5 is a block diagram illustrating an example of a random number generation device according to another embodiment.

FIG. 5 illustrates an example of a random number generation device according to another embodiment. Elements similar to or the same as those illustrated in FIG. 4 are denoted by the same reference signs and detailed description thereof is omitted. For example, a random number generation device 104 illustrated in FIG. 5 is provided in the FPGA or the ASIC (not illustrated) of the calculation server 310 illustrated in FIG. 2 or in the FPGA or the ASIC (not illustrated) of the calculation server 410 illustrated in FIG. 3. The random number generation device 104 includes three normal random number generation units NGEN1, NGEN2, NGEN3. Since the normal random number generation units NGEN1, NGEN2 have the same configuration as those of the normal random number generation units NGEN1, NGEN2 illustrated in FIG. 4, illustration thereof is omitted.

For example, the normal random number generation unit NGEN3 includes eight XOR1s, four XOR2s, and the adder 32. Each of the XOR1s is an example of the first exclusive OR circuit, and each of the XOR2s is an example of a second exclusive OR circuit. For example, each of the XOR1s generates the uniform random number URN3 based on two uniform random numbers URN1 generated by two uniform random number generators 10 (FIG. 4) or two uniform random numbers URN2 generated by two uniform random number generators 20 (FIG. 4).

Each of the XOR2s generates a uniform random number URN4 based on two uniform random numbers URN3 generated by 2 XOR1s. For example, each of the XOR2s performs a bit operation of an exclusive OR on a plurality of bits of two uniform random numbers URN3 bitwise, thereby generating the uniform random number URN4. For example, each of the XOR2s takes an exclusive OR of the bit values of the same bit numbers in two uniform random numbers URN3, thereby generating bit values of the uniform random number URN4.

The adder 32 adds up a plurality of uniform random numbers URN3, URN4 to generate the normal random number NRN3. For example, the adder 22 adds up twelve uniform random numbers URN3, URN4 not correlated to each other. This allows generation of the normal random number NRN3 in accordance with the central limit theorem. For example, it is confirmed in advance that the uniform random numbers URN4 generated by the XOR2s are not correlated to the URN3 generated by the XOR1s or any one of the URN4 is not correlated to another UNR4 by giving various seed values to the uniform random number generators 10, 20 (FIG. 4).

Figure 6:
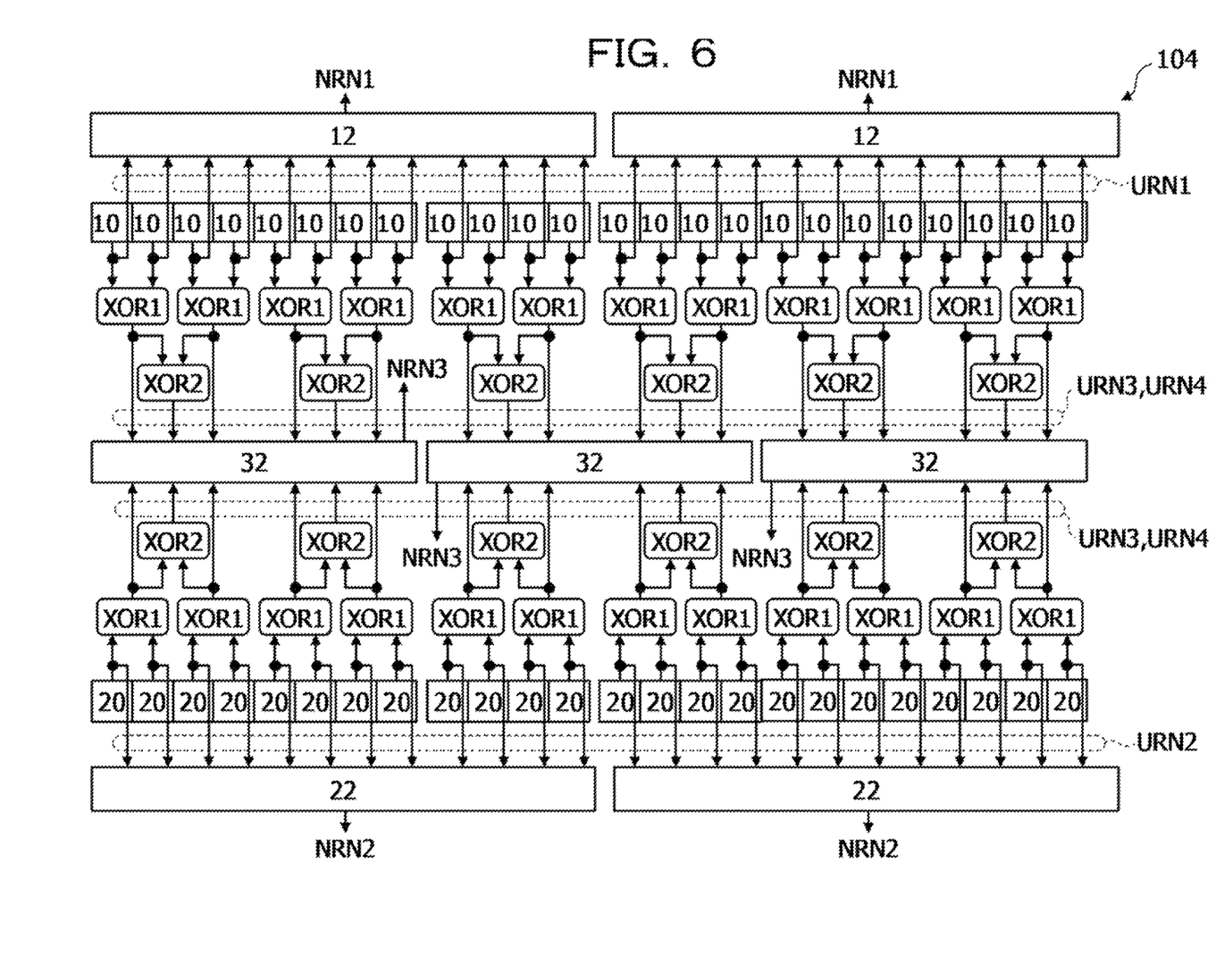
FIG. 6 is a block diagram illustrating an example of the scale of a circuit used for generating a normal random number in the random number generation device illustrated in FIG. 5.

FIG. 6 illustrates an example of the scale of the circuit used for generating the normal random number NRN3 in the random number generation device 104 illustrated in FIG. 5. FIG. 6 illustrates a configuration of a circuit that generates two normal random numbers NRN1, two normal random numbers NRN2, and three normal random numbers NRN3. In this case, the circuit scale of the 24 uniform random number generators 10, 24 uniform random number generators 20, and 36 XOR1s and XOR2s included in the random number generation device 104 is 912 in terms of NAND gates.

When 36 uniform random number generators 10 are provided instead of the 36 XOR1s and XOR2s, the circuit scale of the random number generation device is 1344 in terms of NAND gates. Accordingly, the logic scale of the random number generation device 104 except for the adders 12, 22, 32 is able to be reduced by 32% ((1344-912)11344) compared to the logic scale of a normal random number generation device including seven normal random number generators that are identical to each other.

As has been described, according to the embodiment illustrated in FIGS. 5 and 6, a larger number of normal random numbers NRN may be generated while further suppressing the circuit scale of the random number generation device 104 compared to the embodiments illustrated in FIGS. 1 and 4. Furthermore, the normal random numbers NRN3 conforming to a high-quality normal distribution may be generated in accordance with the central limit theorem when the uniform random numbers URN3, URN4 used to generate the normal random numbers NRN3 are generated by using the XOR1s and XOR2s.

Figure 7:
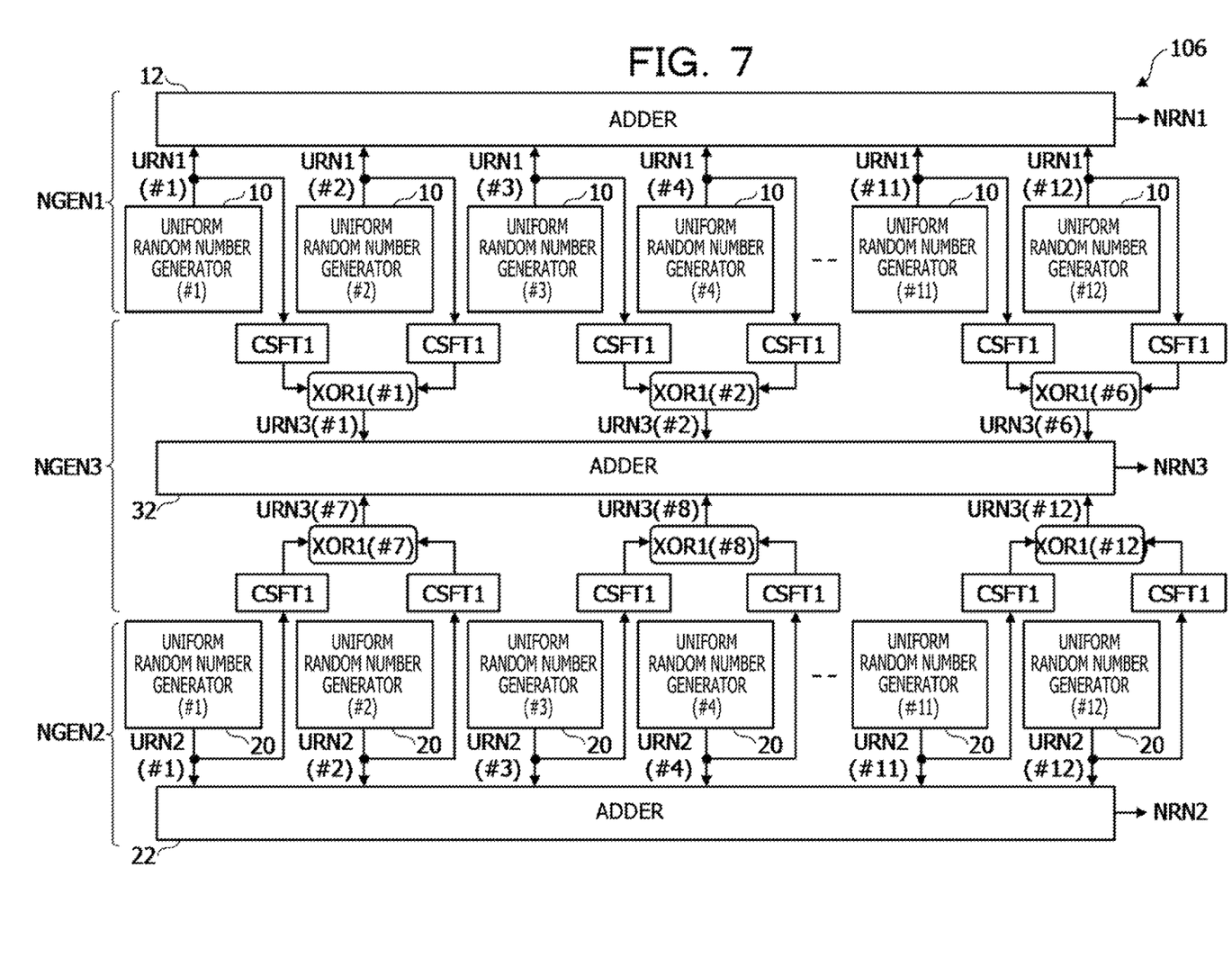
FIG. 7 is a block diagram illustrating an example of a random number generation device according to another embodiment.

FIG. 7 illustrates an example of a random number generation device according to another embodiment. Elements similar to or the same as those illustrated in FIG. 4 are denoted by the same reference signs and detailed description thereof is omitted. For example, a random number generation device 106 illustrated in FIG. 7 is provided in the FPGA or the ASIC (not illustrated) of the calculation server 310 illustrated in FIG. 2 or in the FPGA or the ASIC (not illustrated) of the calculation server 410 illustrated in FIG. 3. The random number generation device 106 includes three normal random number generation units NGEN1, NGEN2, NGEN3. The normal random number generation units NGEN1, NGEN2 have the same configuration as those of the normal random number generation units NGEN1, NGEN2 illustrated in FIG. 4.

In the normal random number generation unit NGEN3, cyclic shifters CSFT1 are coupled to inputs of each of the XOR1s of the normal random number generation unit NGEN3 illustrated in FIG. 4. Each of the shifters CSFT1 is an example of a first shifter. The configuration of the random number generation device 106 is similar to or the same as that of the random number generation device 102 illustrated in FIG. 4 except for addition of the shifters CSFT1.

Each of the shifters CSFT1 cyclically shifts the bits of the uniform random number URN1 (or URN2) output from the uniform random number generator 10 (or 20) and outputs the shifted uniform random number URN1 (or URN2) to the XOR1. The number of bits to be shifted in 24 shifters CSFT corresponding to a single adder 32 may be equal to each other or different from each other.

According to the present embodiment, the uniform random numbers URN1 (or URN2) are input to the XOR1s via the cyclic shifters CSFT. Accordingly, for example, even when the uniform random number generators 10 (or 20) generate the uniform random numbers URN1 (or URN2) based on the same seed value, twelve uniform random numbers URN3 are able to be generated with the correlation therebetween abolished. The number of bits to be shifted by the shifters CSFT is predetermined so that the uniform random numbers URN3 respectively generated by a plurality of the XOR1s are not correlate to each other. Thus, the normal random numbers NRN3 conforming to a high-quality normal distribution may be generated in accordance with the central limit theorem, With the shifters CSFT1, the circuit scale of the random number generation device 106 becomes larger than the circuit scale of the random number generation device 102 illustrated in FIG. 4. However, with the shifters CSFT1, for example, even when the uniform random number generators 10 (or 20) use a common seed value, the correlation between the uniform random numbers URN1, URN2 used for generating the normal random numbers NRN3 may be lowered.

Thus, for example, a generation circuit that generates a plurality of seed values may be omitted, and a larger number of normal random numbers NRN3 conforming to a high-quality normal distribution may be generated while suppressing an increase in the circuit scale when the entirety of the random number generation device 106 is seen.

As has been described, according to the embodiment illustrated in FIG. 7, for example, even when the uniform random numbers URN1, URN2 are generated based on the same seed value, twelve uniform random numbers URN3 the correlation between which are abolished may be generated by coupling the cyclic shifters CSFT to the inputs of the XOR1s. As a result, a larger number of normal random numbers NRN3 conforming to a high-quality normal distribution may be generated while suppressing an increase in the circuit scale.

Figure 8:
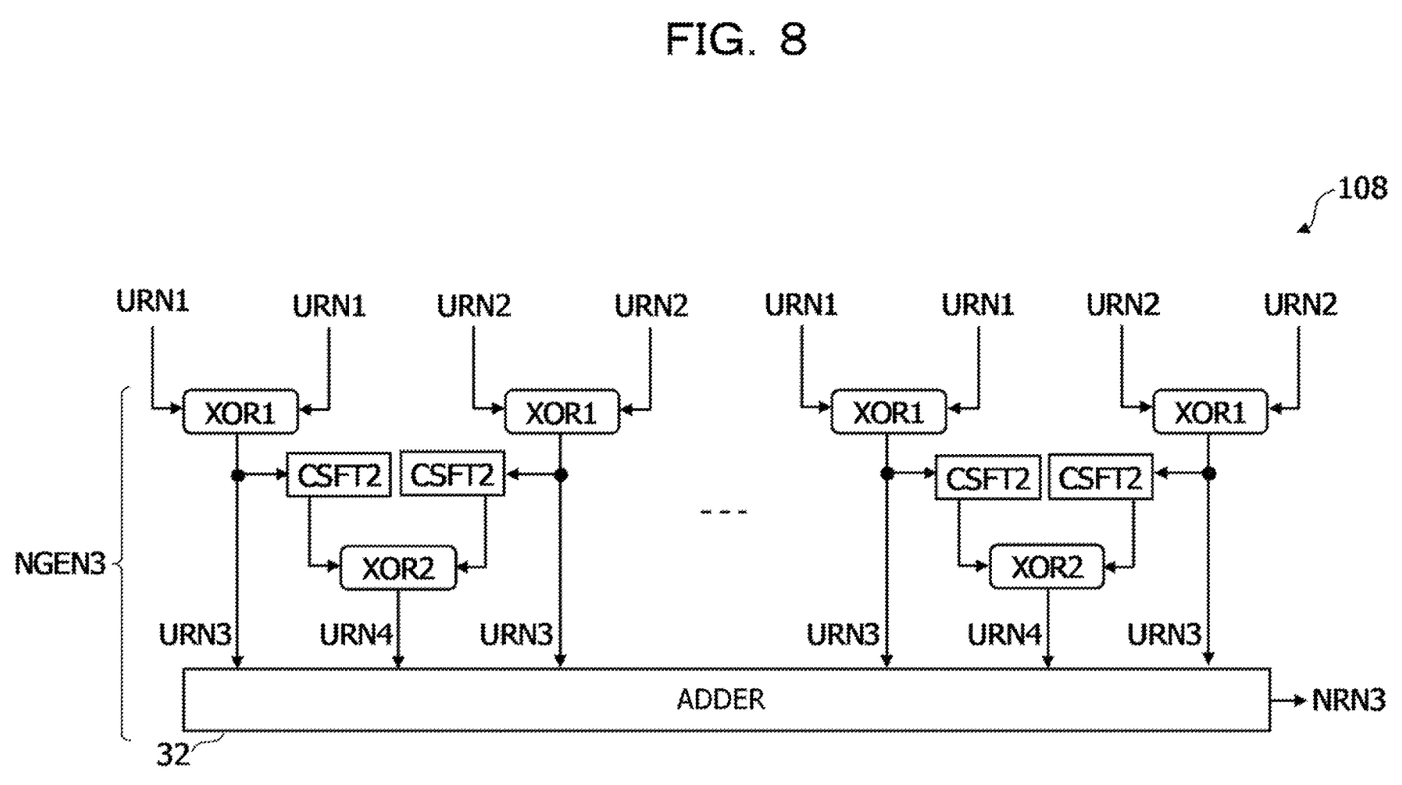
FIG. 8 is a block diagram illustrating an example of a random number generation device according to another embodiment.

FIG. 8 illustrates an example of a random number generation device according to another embodiment. Elements similar to or the same as those of the above-described embodiments are denoted by the same reference signs and detailed description thereof is omitted. For example, a random number generation device 108 illustrated in FIG. 8 is provided in the FPGA or the ASIC (not illustrated) of the calculation server 310 illustrated in FIG. 2 or in the FPGA or the ASIC (not illustrated) of the calculation server 410 illustrated in FIG. 3.

In the normal random number generation unit NGEN3, cyclic shifters CSFT2 are coupled to inputs of each of the XOR2s of the normal random number generation unit NGEN3 illustrated in FIG. 5. Each of the shifters CSFT2 is an example of a second shifter. The configuration of the random number generation device 108 is similar to or the same as that of the random number generation device 104 illustrated in FIG. 5 except for addition of the shifters CSFT2.

Each of the shifters CSFT2 cyclically shifts the bits of the uniform random number URN3 output from the XOR1 and outputs the shifted uniform random number URN3 to the XOR2. The number of bits to be shifted in 16 shifters CSFT1 and eight shifters CSFT2 corresponding to a single adder 32 may be equal to each other or different from each other. The numbers of bits to be shifted by the shifters CSFT1, CSFT2 are predetermined so that the uniform random numbers URN3, URN4 respectively generated by a plurality of the XOR1s and a plurality of the XOR2s are not correlate to each other, Thus, the normal random numbers NRN3 conforming to a high-quality normal distribution may be generated in accordance with the central limit theorem.

According to the present embodiment, as is the case with the random number generation device 106 illustrated in FIG. 7, even when the uniform random number generators 10, 20 generate the uniform random numbers URN1, URN2 based on the same seed value, twelve uniform random numbers URN3, URN4 are able to be generated with the correlation therebetween abolished.

As is the case with the random number generation device 104 illustrated in FIG. 5, each of the XOR2s generates a different uniform random number URN4 by using the uniform random numbers URN3 generated by the XOR1s. Thus, a larger number of uniform random numbers URN3, URN4 may be generated by a small number of uniform random number generators 10, 20.

Figure 9:
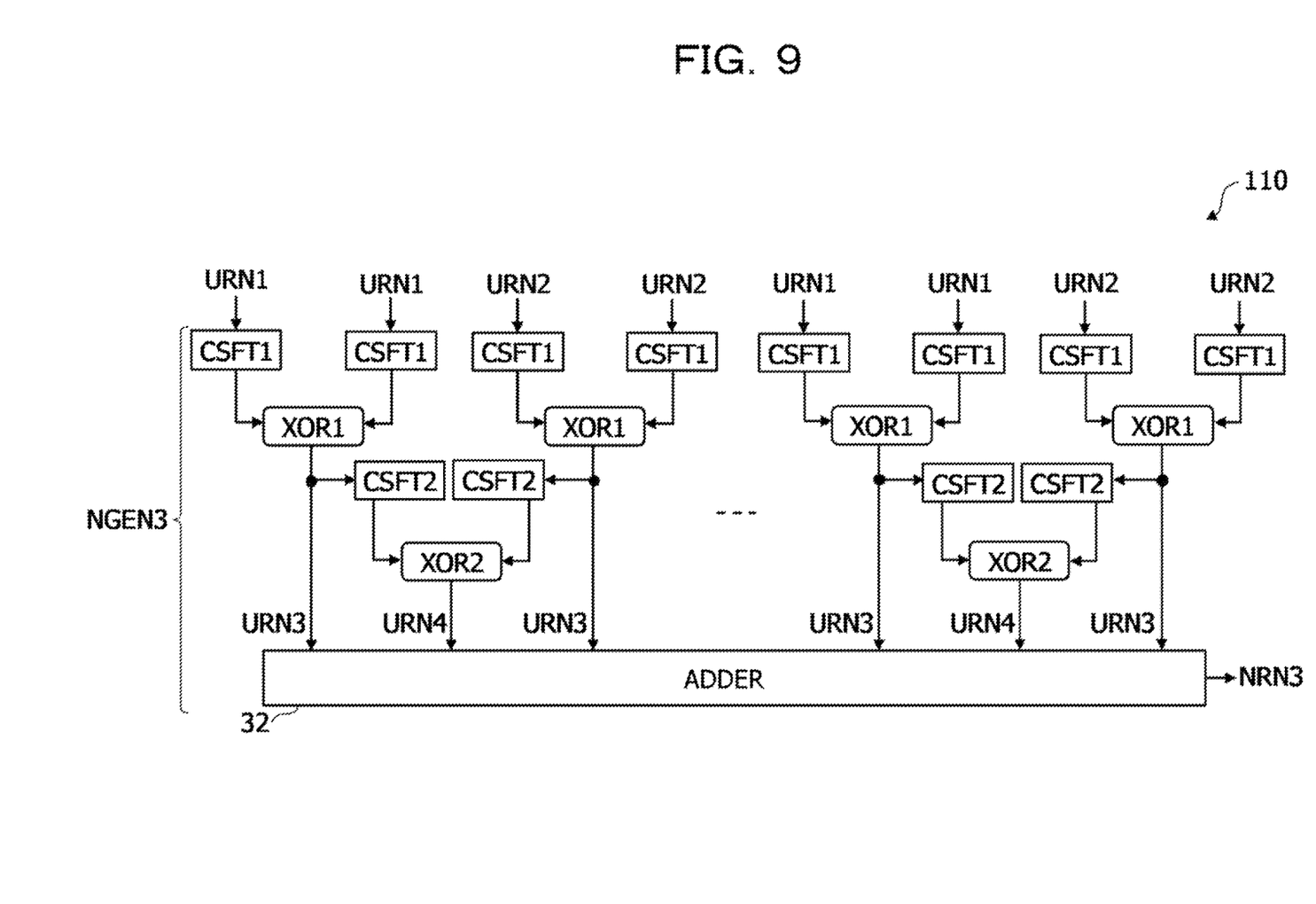
FIG. 9 is a block diagram illustrating an example of a random number generation device according to another embodiment.

FIG. 9 illustrates an example of a random number generation device according to another embodiment. Elements similar to or the same as those of the above-described embodiments are denoted by the same reference signs and detailed description thereof is omitted. For example, a random number generation device 110 illustrated in FIG. 9 is provided in the FPGA or the ASIC (not illustrated) of the calculation server 310 illustrated in FIG. 2 or in the FPGA or the ASIC (not illustrated) of the calculation server 410 illustrated in FIG. 3.

The normal random number generation unit NGEN3 has a configuration in which the cyclic shifters CSFT1 are, similarly to those illustrated in FIG. 7, added to inputs of each of the XOR1s of the normal random number generation unit NGEN3 illustrated in FIG. 8. According to the present embodiment, the effects similar to those of the embodiments illustrated in FIGS. 7 and 8 may be obtained.

Regarding the embodiments illustrated in FIGS. 1 to 9, the following appendices are further disclosed.

Features and advantages of the embodiments will be apparent from the foregoing detailed description. The scope of claims is intended to cover the features and advantages of the embodiments as described above without departing from the spirit and scope of the claims. Any person skilled in the art may readily conceive of any improvements and changes. Accordingly, there is no intention to limit the scope of the inventive embodiments to those described above, and it is possible to rely on appropriate modifications and equivalents included in the scope disclosed in the embodiments.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A random number generation device comprising:
a plurality of circuit groups each including a plurality of first uniform random number generation circuits configured to respectively generate a plurality of first uniform random numbers;
a plurality of first normal random number generation circuits each provided for two or more circuit groups of the plurality of the circuit groups, coupled to the plurality of first uniform random number generation circuits included in the two or more circuit groups and configured to respectively generate a plurality of first normal random numbers based on the plurality of first uniform random numbers;
a plurality of second uniform random number generation circuits each provided for the respective plurality of circuit groups, including a logical operation circuit coupled to the plurality of first uniform random number generation circuits included in the respective plurality of circuit groups and configured to perform a logical operation on bit values of two or more of the plurality of first uniform random numbers, which are generated by the plurality of first uniform random number generation circuits included in the respective plurality of circuit groups, to respectively generate a plurality of second uniform random numbers; and
at least one second normal random number generation circuit coupled to the plurality of second uniform random number generation circuits and configured to generate at least one second normal random number based on the plurality of second uniform random numbers,
the logical operation circuit is configured to perform a bitwise bit operation on a plurality of bits of the two or more of the plurality of first uniform random numbers to generate one of the plurality of second uniform random numbers and includes a first exclusive OR circuit configured to take bitwise exclusive ORs of the plurality of bits of the two or more of the plurality of first uniform random numbers to generate the one of the plurality of second uniform random numbers and a first shifter configured to cyclically shift bits of one of the plurality of first uniform random numbers and output the one of the plurality of first uniform random numbers that has been shifted in bits to the first exclusive OR circuit.

2. The random number generation device according to claim 1, wherein the logical operation circuit further includes a second exclusive OR circuit configured to take bitwise exclusive ORs of the plurality of bits of the plurality of second uniform random numbers to generate a third uniform random number, and wherein the at least one second normal random number generation circuit generates the at least one second normal random number based on the plurality of second uniform random numbers and the third uniform random number.

3. The random number generation device according to claim 2, wherein the logical operation circuit further includes a second shifter configured to cyclically shift bits of one of the plurality of second uniform random numbers and output the one of the plurality of second uniform random numbers that has been shifted in bits to the second exclusive OR circuit.

4. The random number generation device according to claim 1, wherein a configuration of the plurality of first normal random number generation circuits and a configuration of the at least one second normal random number generation circuit are identical to each other.

5. The random number generation device according to claim 1, wherein the at least one second normal random number generation circuit includes a single second normal random number generator, and the at least one second normal random number includes a single second normal random number, and wherein the single second normal random number generator is provided for two of the plurality of first normal random number generation circuits, and the single second normal random number is generated for two of the plurality of first normal random numbers.

6. A method of generating random numbers, comprising:
generating, by a plurality of circuit groups each including a plurality of first uniform random number generation circuits, respectively a plurality of first uniform random numbers;
generating, by a plurality of first normal random number generation circuits each provided for two or more circuit groups of the plurality of the circuit groups, coupled to the plurality of first uniform random number generation circuits included in the two or more circuit groups, respectively a plurality of first normal random numbers based on the plurality of first uniform random numbers;
performing, by a plurality of second uniform random number generation circuits each provided for the respective plurality of circuit groups, including a logical operation circuit coupled to the plurality of first uniform random number generation circuits included in the respective plurality of circuit groups, a logical operation on bit values of two or more of the plurality of first uniform random numbers, which are generated by the plurality of first uniform random number generation circuits included in the respective plurality of circuit groups, to respectively generate a plurality of second uniform random numbers; and generating, by at least one second normal random number aeneration circuit coupled to the plurality of second uniform random number generation circuits, at least one second normal random number based on the plurality of second uniform random numbers, the logical operation circuit is configured to perform a bitwise bit operation on a plurality of bits of the two or more of the plurality of first uniform random numbers to generate one of the plurality of second uniform random numbers and includes a first exclusive OR circuit configured to take bitwise exclusive ORs of the plurality of bits of the two or more of the plurality of first uniform random numbers to generate the one of the plurality of second uniform random numbers and a first shifter configured to cyclically shift bits of one of the plurality of first uniform random numbers and output the one of the plurality of first uniform random numbers that has been shifted in bits to the first exclusive OR circuit.

7. The method according to claim 6, wherein a second exclusive OR circuit included in the logical operation circuit takes bitwise exclusive ORs of the plurality of bits of the plurality of second uniform random numbers to generate a third uniform random number, and wherein the at least one second normal random number aeneration circuit generates the at least one second normal random number based on the plurality of second uniform random numbers and the third uniform random number.

8. The method according to claim 7, wherein a second shifter included in the logical operation circuit cyclically shifts bits of one of the plurality of second uniform random numbers and outputs the one of the plurality of second uniform random numbers that has been shifted in bits to the second exclusive OR circuit.

* * * * *